July 19, 1938.  W. H. WHEELER, JR., ET AL  2,124,383
POSTAGE METER MACHINE
Filed Sept. 26, 1933    7 Sheets-Sheet 1

Inventors
Walter H. Wheeler Jr.
and Jacob W. Ogden
Alexander Sowell
Attorney

July 19, 1938.  W. H. WHEELER, JR., ET AL  2,124,383
POSTAGE METER MACHINE
Filed Sept. 26, 1933　　7 Sheets-Sheet 2

July 19, 1938.   W. H. WHEELER, JR., ET AL   2,124,383
POSTAGE METER MACHINE
Filed Sept. 26, 1933   7 Sheets-Sheet 6

Patented July 19, 1938

2,124,383

UNITED STATES PATENT OFFICE 2,124,383

POSTAGE METER MACHINE

Walter H. Wheeler, Jr., and Jacob W. Ogden, Stamford, Conn., assignors to Pitney-Bowes Postage Meter Co., Stamford, Conn., a corporation of Delaware Application September 26, 1933, Serial No. 691,068

11 Claims. (Cl. 235—101)

This invention is an improvement in postage meter machines of the type shown in our Patent No. 1,874,073, dated August 30, 1932 and its principal objects are to provide a simple machine of the nature capable of printing a much wider range of selected stamp denominations or values and also to provide novel means for registering the values of the stamps printed by the machine. The novel machine has means for printing any of a plurality of denominations, and means for registering the denominations printed, and two actuating mechanisms for the tens wheel of the register, one operated by the units wheel, and the other operated by a direct means independent of the units wheel device.

Another object is to provide a register and an adjustable variable register actuating means, and means whereby said actuating means may be set to drive either the units wheel of the register, or the tens wheel of the register in accordance with the denomination or value to be registered.

Another object is to provide a register of the character described having a tens wheel operable selectively by the units wheel or by independent means, and means whereby after each operation of the tens wheel the respective actuating mechanism is slightly advanced beyond the necessary extent of advancing movement. A further object is to provide means for retarding the tens wheel actuating mechanism when so advanced beyond the normal extent.

A further object is to provide a machine of the character described with improved stamp selecting devices whereby the machine can be readily adjusted to print stamp values of any desired denomination within the capacity of the machine, and with means whereby at the same time the register operating mechanism is properly shifted so that the value of each stamp printed will be properly registered.

The accompanying drawings illustrate a machine of the type shown in our aforesaid patent equipped with improvements in accordance with our invention, and we will describe such invention with reference to said drawings to enable others to adapt and use the same; but we do not consider the invention restricted to the type of machines illustrated as various features of the invention are adapted for use in other types of printing and registering machines, and therefore we refer to the claims following the description for the essentials of the invention and novel features of construction and novel combinations of parts for which protection is desired.

The machine illustrated is in general similar to the machine shown in our aforesaid patent;

and comprises a base portion A and a portable unit B detachably mounted thereon. The base carries the envelope sealing mechanism and impression roller, and can be mounted on any suitable support. The portable unit B contains the printing dies and registering mechanism and can be detached from the base and carried to a post-office to have the register "charged" with an amount of prepaid postage. Unit B and base A are provided with mechanisms, as described in said patent, which when the unit is properly mounted on the base renders the machine as a whole operative, but will prevent operation thereof, or of the printing mechanism, or register, when the unit B is separated from the base.

Pivoted on the base is a frame 112 containing an impression roller and means for moistening the flap of the envelope. The impression roller is driven from the printing drum actuating shaft. When the base and portable unit are properly assembled the impression roller is directly under the printing drum 16 and an envelope passing between them will receive an imprint from a stamp die on the drum.

The printing drum

At the front of unit B (Figs. 1-3) is a housing within which is a revolvable drum 16 mounted upon an actuating shaft 6. Said drum carries a post marking die 18, and stamp die 17. Die 18 is engraved with the name of the post office and provided with adjustable date printing wheels 18a. Die 17 is provided with a revolvable printing wheel 17a bearing on its rim the various money values or stamp denominations. When the printing drum is turned in a counter clockwise direction the stamp die 17 will be moved past the printing point (i. e. opposite the impression roller) just in advance of the postmark die.

Figure 3:
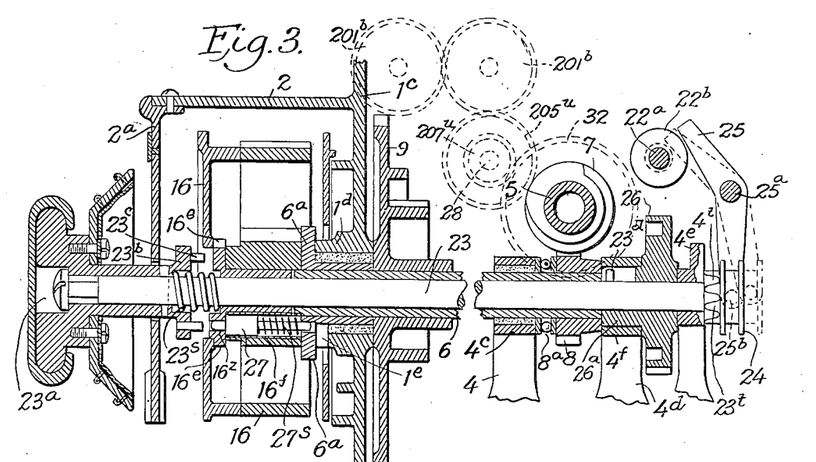
Fig. 3 is a detail longitudinal section in the plane of the rod 23 showing the parts adjustable by said rod.

The drum shaft 6 has one bearing in the front 1c of the casing, and another in a member 4c of a bracket 4 (see Fig. 3). On the front end of shaft 6 within housing 2 is a flange 6a to which the printing drum 16 is attached. On the rear end of shaft 6 is a spiral gear 8, a thrust bearing 8a being interposed between said gear 8 and bearing member 4c. Gear 8 meshes with a spiral gear 7 (Figs. 1-3) on a drive shaft 5, which can be revolved by a hand crank 21; or other suitable means. Adjacent shaft 5 is a shaft 22a (Figs. 1-3) one end of which normally projects through wall 1b and acts as a stop for crank 21. Shaft 22a is normally moved outward by a coiled spring 22s interposed between a collar 22b on the rod and the bracket 4, the outward movement of the shaft being limited by a stop collar 22c carrying a pin 22d which engages a cam slot 22t in a curved plate 22e fastened to the wall 1b.

On the outer end of shaft 22a is a lever 22 (Figs. 1-2) which can be moved by the thumb of the operator's hand when operating crank 21; and when shaft 22a is thus turned the pin 22d engaging cam slot 22t will cause the shaft to move inwardly and withdraw out of the path of crank 21, which can then be turned. When crank 21 has passed shaft 22a lever 22 is released and shaft 22a is moved outward by spring 22s into position to stop the crank 21 at the end of the revolution of shaft 5.

In this machine the printing drum is revolved once for every stamp printed in order to bring the dies into contact with the inker to prepare them for printing; and to actuate mechanism which registers the value of the stamp printed.

In operating the machine an envelope is slid, flap downward, from left to right (Fig. 1) over the frame 112 until its leading end is slightly between the impression roller and drum 16. Then lever 22 is pressed with the thumb to move shaft 22a out of the way of crank 21 and the latter is then turned one revolution, being then arrested by the end of shaft 22a which should be released as soon as crank 21 has passed it. This movement of crank 21 causes the printing drum 16 to revolve once; and in so doing the dies will be inked and shortly before they reach the printing point the envelope will be gripped between the drum and revolving roller and, if but one stamp is to be printed thereon, will be forwarded through and delivered onto the table or any suitable receiver at the right of the machine. During such passage the dies make an imprint on the face of the envelope, the flap of the envelope is moistened, and in passing between the drum and roller will be caused to adhere to the envelope as described in our aforesaid patent.

If it is necessary to make two or more stamp impressions on the envelope to place the proper amount of postage thereon, the envelope is stopped immediately after the first imprint has been made thereon, and is held in such position while the printing drum completes its revolution; then the drum is again revolved and when the stamp die 17 again arrives at the printing point the envelope is released and advanced sufficiently to take the second impression; as described in our aforesaid patent.

The stamp selecting devices

A rod 23 extends axially through the shaft 6 and drum 16 and projects through an opening in the cover plate 2a of the drum housing (Fig. 3), and has a knob 23a on its front end. The rear end of rod 23 is supported in a fixed bracket member 4e and carries a castellated collar 23t which is adapted to engage an opposed castellated flange 4t on member 4e. The member 4e is preferably made detachable for convenience in assembling. A revolvable face cam 26 is mounted on rod 23 between gear 8 and member 4e and has a sleeve hub 26a mounted in a fixed bracket member 4d.

The denomination printing wheel 17a (Figs. 1-4) is mounted on a shaft 17b in drum 16, and on the outer end of shaft 17b is fastened a gear 17c which meshes with a similar gear 16e, having its hub revolvably supported in an axial bore in the drum, rod 23 extending through said hub. Gear 16e has a series of holes 16z (one for each denomination engraved on wheel 17a) through it, equally spaced around its axis.

A disk 23b is fastened to rod 23 opposite gear 16e and has a series of projecting pins 23c spaced similar to the holes in the gear 16e which they are designed to enter. A spring 23s interposed between the gear 16e and disk 23b normally separates them and also forces the rod 23 to normally remain in its outermost position and holds the castellated collar 23t in engagement with flange 4t.

Figure 4:
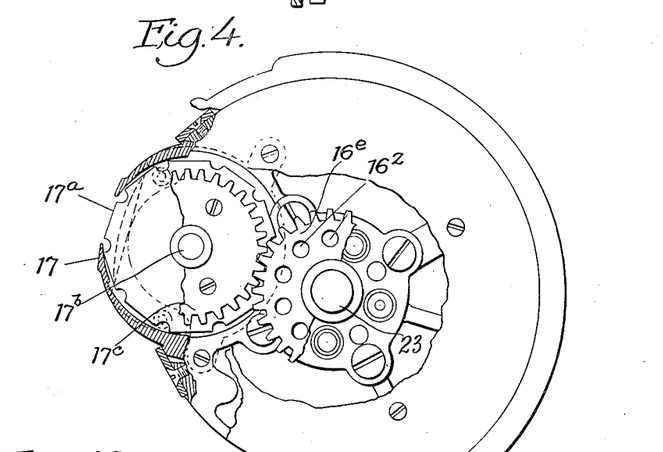
Fig. 4 is an enlarged front view of the drum partly in section.
Figure 4A:
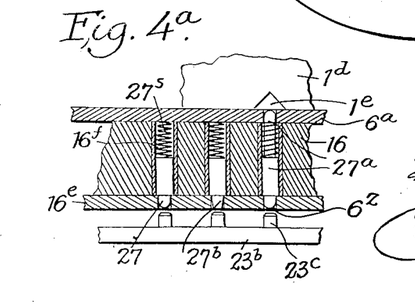
Fig. 4a is a detail.

In the body of the hub of the drum 16 (Figs. 3-4a) and in alignment with the holes in the gear 16e, are a circular series of holes 16f in which are tumbler pins 27 (Fig. 4a). These pins are normally projected by springs 27s, so that their extreme outer ends will be flush with the outer surface of gear 16e (see Figs. 3-4a). The pins 27 will lock the gear 16e to the drum 16, and as gears 16e and 17c are in mesh, the denomination wheel 17a will also be locked to the drum; and when so locked the drum and wheel 17a may be revolved as a unit but their relative positions can only be altered by moving gear 16e relatively to the drum. The tumbler pins 27 are preferably constructed and arranged to operate substantially as described in our aforesaid patent.

When the drum is at rest, at the end of a complete revolution, the holes in gear 16e will be in alignment with the pins 23c of disk 23b (see Figs. 3, 4, 4a). Then by pushing knob 23a inward the rod 23, disk 23b and stop collar 23t will be moved inward, thereby disengaging collar 23t from flange 4t; and causing pins 23c to enter the holes in gear 16e and displace the tumbler pins 27; and then rod 23 with all parts fastened to it may be revolved. When rod 23 is turned gear 16e will turn the denomination wheel 17. Thus any desired value engraved thereon can be brought to operative position. When the desired selection has been made knob 23a is released and spring 23s will return rod 23 to its normal position, withdrawing pins 23c from gear 16e and uncoupling gear 16e from the shaft, and pins 27 will lock the gear to the drum and thus lock the denomination wheel 17 in the position to which it was previously adjusted relative to the drum, and stop collar 23t will re-engage flange 4t and prevent further turning of rod 23.

The spacing of the pieces on the rod 23 (Fig. 3) is such that the stop collar 23t will not be disengaged from flange 4t until the coupling of the gear 16e to the shaft is completed, so that the knob 23a cannot be turned without also turning the denomination wheel. The lands and spaces of the castellated stop collar 23t and flange 4t are such that engagement of the two can only take place at points in the circle corresponding to the points where the holes in gear 16e will register with the tumbler pins 27. The number of castellations in flange 4t and in collar 23t are equal to the number of values engraved on denomination wheel 17a, and the rod 23 may be located in any desired angular position by first pushing the knob 23a inward to disengage collar 23t from flange 4t—then turning it to the division desired, and then allowing the collar to re-engage the flange.

The selection of dies can be made only at a time when the drum is in its normal position of rest; and in order to prevent accidental operation of the handle 21 at the time the selection is being made shaft 22a is prevented from moving inward during the die selecting operation by means of a lever 25 (Fig. 3) which is pivoted at 25a to a member of the bracket 4. One arm of lever 25 is provided with a pin 25b which engages a groove in stop collar 23t and the upper arm of lever 25 is adapted to engage a collar 22b on shaft 22. When the rod 23 is pushed inward preparatory to selecting a stamp die the stop collar 23t will rock the lever 25 and cause its upper arm to move into the path of collar 22b and prevent inward movement of shaft 22a and the release of the hand crank 21 until rod 23 is again moved outward.

The parts of the machine thus far referred to are preferably constructed and arranged to operate substantially as shown and described in our Patent 1,874,073 above referred to and therefore do not require further detailed description nor illustration herein.

*The registering mechanism*

In the machine shown two counters or registering mechanisms are employed, one of them registering in ascending order the total of the values of all stamps printed; the other subtracting these values from the amount of prepaid postage for which it was originally set by a post office official. The means for setting the subtracting counter and for locking the mechanism when this predetermined amount has been exhausted has been described in our prior patents and need no further description here.

Both counters are mounted in a frame having two end walls 200a and 200b with a middle wall 200c between and as the counters are of identical design the description of one will explain both.

Each register shown is in general of the well known geared type in which the excess of ten in any denomination wheel is transferred to the wheel of next higher denomination by means of "Geneva" gears. In our invention however the registers essentially differ from the standard constructions in that both the "units" wheels, and the "tens" wheels are independently operated, so that comparatively high values may be quickly registered without imparting the usual extent of movement to the units wheel.

Figure 9:
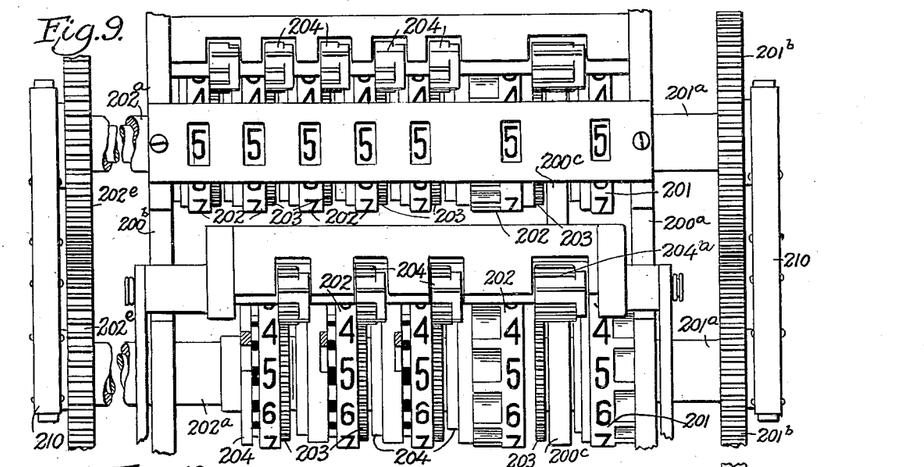
Fig. 9 is an enlarged plan view of the registers.
Figure 10:
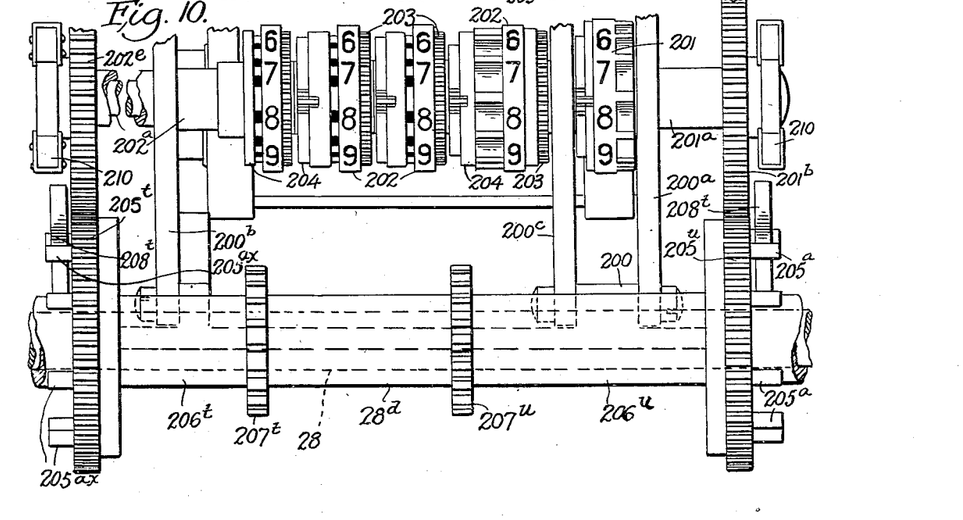
Fig. 10 is a front elevation of Fig. 9.
Figure 11:
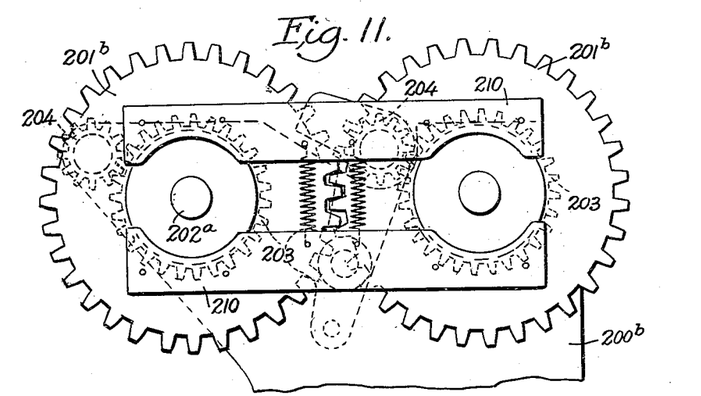
Fig. 11 is an end view of Fig. 10.

As shown in Figs. 9 and 10 the units wheel 201 is made fast to a shaft 201a journaled in the walls 200a and 200c and has a driving gear wheel 201b on its outer end. A second shaft 202a in axial alignment with shaft 201a has one end journaled in wall 200b and has a driving gear 202e fastened on its outer end. The opposite end of said shaft 202a is supported by a disc 202x which forms a part of the tens wheel structure 201, clearly shown in Fig. 14.

Figure 12:
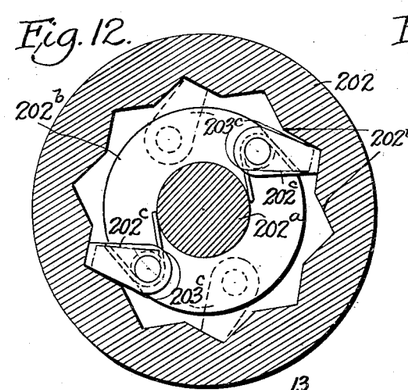
Fig. 12 is a transverse sectional view on the line 12—12, Fig. 14 of the descending counter showing a tens wheel with the tens driving pawls in a driving position in solid lines and in a retracted position in dot and dash lines.
Figure 13:
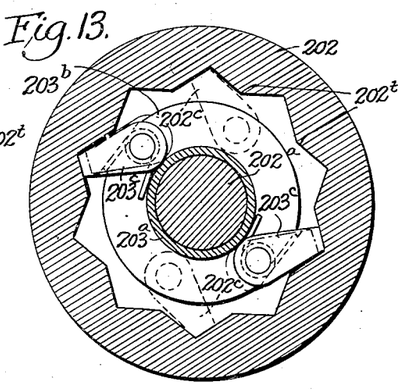
Fig. 13 is a sectional view on the line 13—13, Fig. 14 which is similar to Fig. 12 but shows the units driving pawls in a driving and retracted position.
Figure 14:
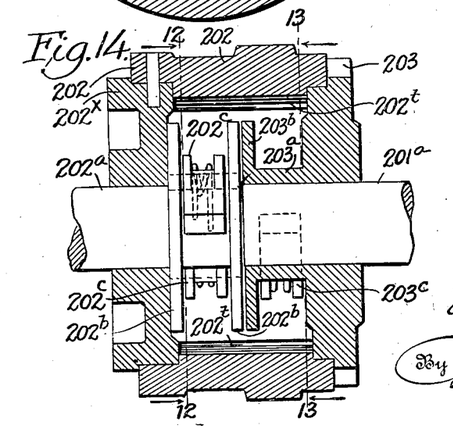
Fig. 14 is an enlarged sectional view through the tens wheel.

On shaft 201a adjacent the wall 200c is loosely mounted a gear wheel 203, having a cylindrical projection or hub 203a, and a flange 203b (Fig. 14). On the shaft 202a adjacent the flange 203b are formed or fixedly secured two similarly spaced flanges 202b. Loosely mounted on the shaft adjacent the outermost of these flanges 202b is a disc 202x, and attached to or formed integral with this disc is a cylindrical shell 202, the end of which opposite the disc 202x has a rotative fit on the periphery of the gear 203 as shown in Figs. 10 and 14. The shell 202 has a bearing on the hub of the gear wheel 203. Said shell 202 encloses both the flanged portions 202b of the shaft 202a and hub of wheel 203, and is provided with ten internal ratchet teeth 202t (Figs. 12, 13 and 14) designed to be engaged by pawls 203c. In the groove between the flange 203b and the body of the wheel 203 are mounted two spring actuated pawls 203c which are adapted to engage the ratchet teeth 202t of shell 202. Between the flanges 202b of shaft 202a are also mounted two pawls 202c similar to the pawls 203c and also adapted to engage the ratchet teeth 202t of shell 202. The outside of the shell is engraved with the ten digits, and the shell 202 with annulus 202x and gear 203 constitute the tens wheel of the counter.

The hundred and higher denomination counter wheels are loosely mounted on the shaft 202a to the left of the tens wheel 202 and fill the space between it and frame 200b.

The Geneva gear wheel 204a mounted between the units wheel 201 and the gear wheel 203 serves to drive the tens wheel 202 intermittently (one step at a time), from the units wheel for each revolution of the units wheel. The gear wheel 203 transmitting its motion to the shell 202 through the pawls 203c and ratchet teeth 202t. Other Geneva gears 204 are mounted between the tens and hundreds wheels, the hundreds and thousands wheel etc. as indicated, so that the register will function correctly in the usual manner when driven from the units side, the transferring operations being carried from one wheel to the next through the Geneva's wheels in the well known manner.

When the tens wheel is actuated from the units wheel the ratchet teeth 202t of the moving tens wheel will ride over the pawls 202c of the then stationary shaft 202a. On the other hand if the shaft 202a is revolved by gear wheel 202e, the pawls 202c will engage ratchet teeth 202t and turn the tens wheels 202, and the ratchet teeth will ride over the pawls 203c of gear 203 which will then be stationary like the units wheel. Transferring operations from the tens wheel into the higher orders will be effected, as before, by the Geneva wheels, but the units wheel will not be affected.

The units wheels of the adjacent counters are geared together by their intermeshing gear wheels 201b; and the shafts 202a of both counters are geared together by their intermeshing gears 202e, so that both counters will be affected alike by the operation of the machine.

*The selective register actuating mechanism*

Figures 1, 2:
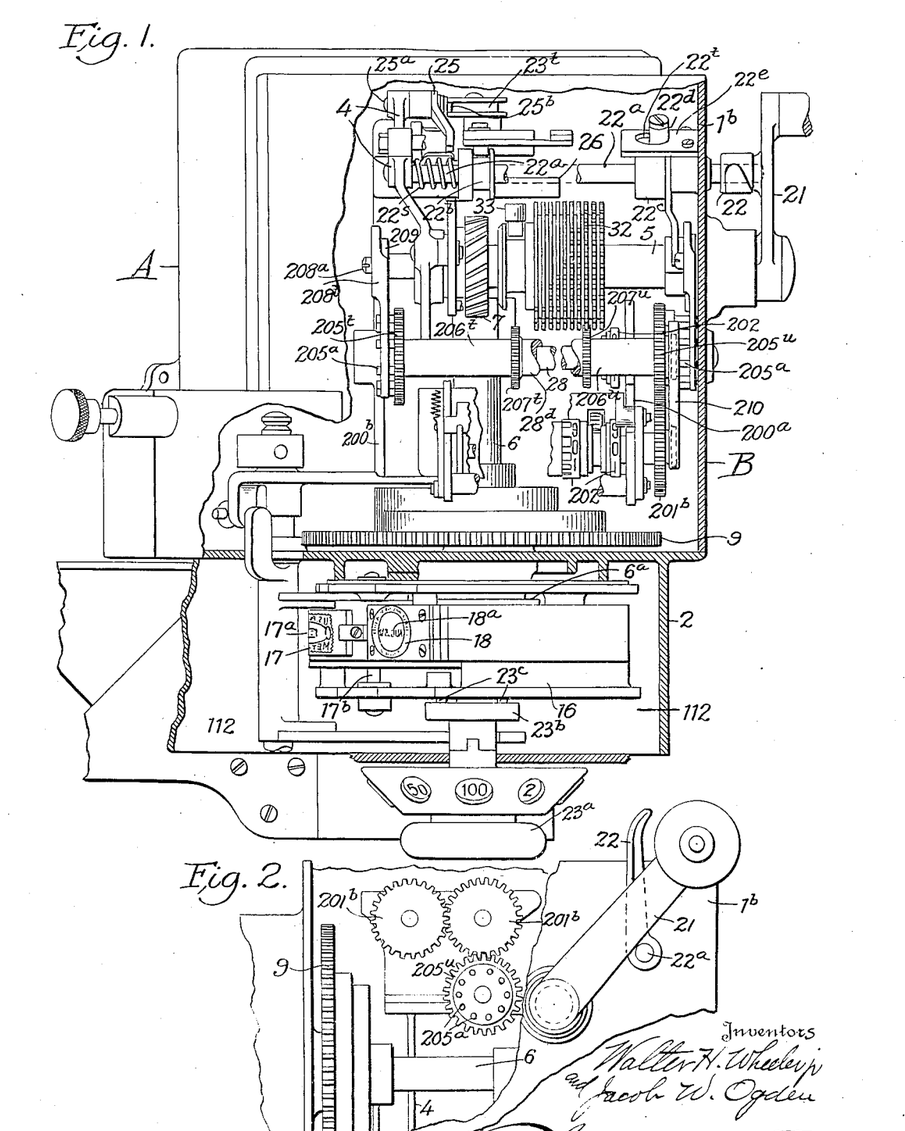
Fig. 1 is a plan view partly broken away of the complete machine.
Fig. 2 is a detail view of the manually operable driving mechanism thereof.
Figure 5:
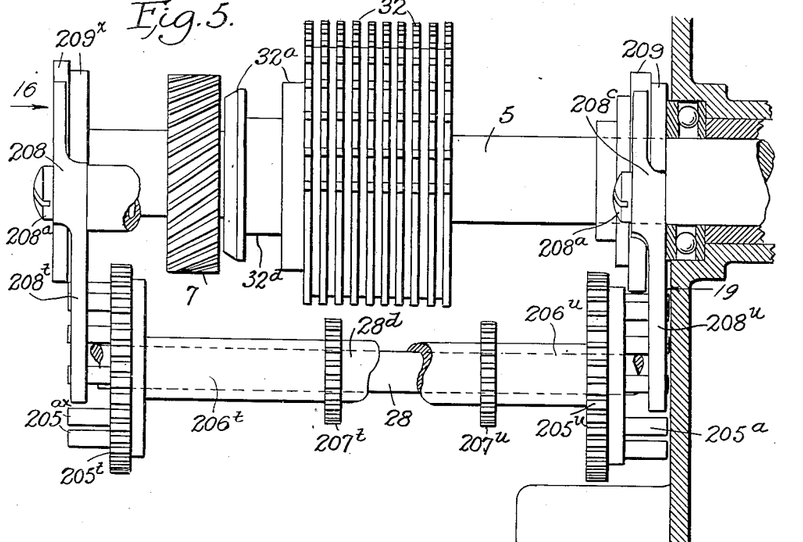
Fig. 5 is an enlarged plan view of the adjustable gear segments and register actuating gears.

The units wheel gear 201b is operated by a gear 205u (Fig. 10) and the tens wheel shaft gear 202e is operated by gear 205t (Fig. 10). The gears 205u and 205t are respectively fastened to sleeves 206u and 206t (Fig. 10) revolvably mounted on a supporting shaft 28 (Figs. 1 and 5). The sleeves are respectively provided with pinions 207u and 207t which are adapted to be engaged with mutilated gear segments 32 (one for each denomination of stamp) (Fig. 5) which are mounted on a slidable carrier 32a keyed to the main shaft 5 (Fig. 1). Said gear segments are mutilated in accord with the various denominations engraved on the printing wheel 17a.

Each pinion 207t and 207u has ten teeth, and one complete revolution of the sleeve 206u and 206t will cause its related counter wheel to register ten units: i. e., one revolution of sleeve 206u will cause the counter to register ten on the units wheel; and one revolution of sleeve 206t will cause the counter to register ten on the tens wheel making a registration of ten in one case and of one hundred in the other. Consequently the registers will be advanced one, or ten, for each tooth in the pinions 207u and 207t depending on which of the pinions is actuated by segment gears 32.

Figure 7:
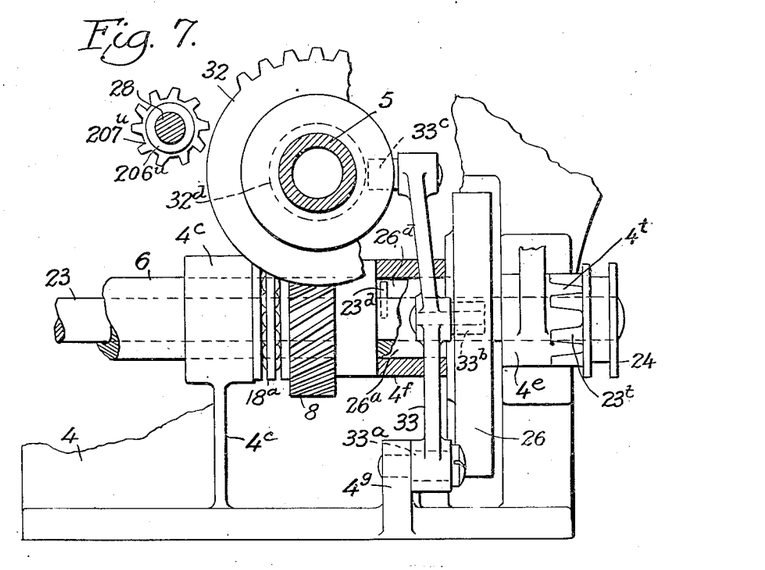
Fig. 7 is a front view of the gear segment shifting device.
Figures 8, 8A:
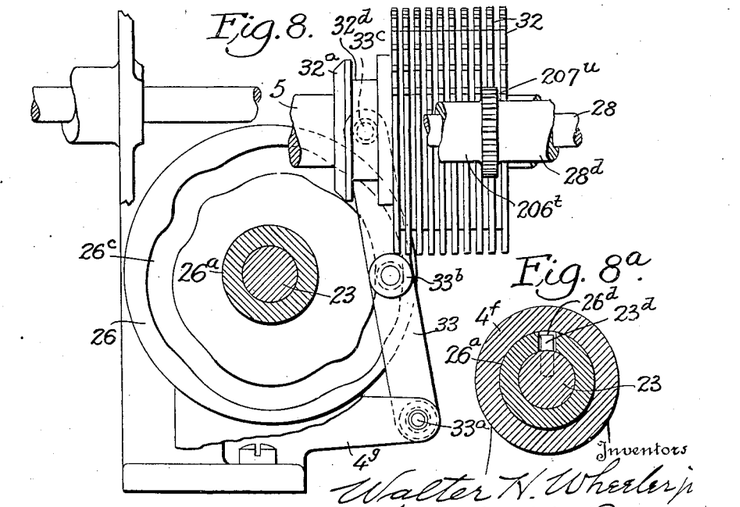
Fig. 8 is a detail view showing the cam and connections for shifting the gear segments.
Fig. 8a is a detail.

The carrier 32a is shifted to bring the proper gear segments into position by means of a cam 26 and a lever 33 (Figs. 7 and 8). Cam 26 is loosely mounted on rod 23 between bracket members 4c and 4e (Fig. 7) and has a hub 26a by which it is supported in member 4f. Rod 23 has a pin 23d engaging an elongated slot 26d in the hub 26a which permits movement of the rod 23 axially of the cam 26, but causes the cam to turn with the rod.

The lever 33 is pivoted at one end to a stud 4g and carries an anti-friction roller 33b, midway of its length, which engages the slot 26c in the face of cam 26. The lever has a roller 33c on its upper end which engages a groove 32d in the hub of carrier 32a. The cam slot 26c has a progressive series of equally spaced dwells (see Figs. 7 and 8) each a unit of distance farther from the center, connected by leads or spiral inclines; whereby if the cam is revolved one revolution the upper end of lever 33 will be moved from the starting position to various equi-distant positions, back to the starting position, and the roller 33c will move the carrier 32a so that each segmental gear 32 thereon will in turn occupy a position in which its teeth would mesh with the pinions 207u or 207t (Fig. 5).

It has been explained above how the relation between the figures on the denomination wheel 17a brought to operative position and the angular position of rod 23 is preserved; and as the position of cam 26 is also governed by the position of rod 23, it follows that the proper operative relation of the wheel 17a and the gear segments 32 for operating the counters will also be maintained; and the mechanisms for selecting the stamp denomination, from the index on the knob 23a to the gear segments 32 are operated in harmony and proper relation.

As but one of the register operating pinions 207u or 207t may be operated at any one time, the space between the "tens" pinion 207t and units pinion 207u must be such that it will be impossible for both of them to be simultaneously engaged by segments 32. To preserve this spacing a distance piece 28d is secured to rod 28 (Fig. 10). For example, if a small denomination is set up or to be printed, a correspondingly small denomination is to be registered, therefore the carrier 32a will be so shifted that the proper segmental gear 32 thereon will be brought into position to mesh with the units pinion 207u and motion would be transmitted from this gear through sleeve 206u and gear 205u to the gear 201b operating the units wheel of the counter as above described, and the pinion 207t would not be engaged nor operated by the gear segments.

If however a stamp of denomination of ten or more is to be printed then the carrier 32a would be shifted so that the proper gear segment 32 thereon would be brought into position to mesh with the tens pinion 207t so that motion would be imparted from the pinion 207t through sleeve 206t and gear 205t to the gear 202e on the shaft 202a operating the tens wheel as above described, so that the register would be operated only through the tens wheel, the units wheel remaining idle at such time because none of the gear segments 32 could mesh with the units pinion 207u.

*Overthrow of pawls*

As the tens wheel 202 is driven only by the pawls 202c or 203c and as the drive may alternate, being say first from units pinion 207u and then from the tens pinion 207t, the pawls and internal ratchet teeth must either be machined and placed in the most exact manner, or else provision must be made to give the driving pawls an excess movement or overthrow sufficient to insure the proper engagement of the inactive pawls with the ratchet teeth when a change is made in the drive. The exact placing required is impractical, and the necessary slight excess desired cannot be practically obtained from the ordinary drive of the segmental gears; therefore in order to obtain the desired result we provide the following mechanism.

Figure 6:
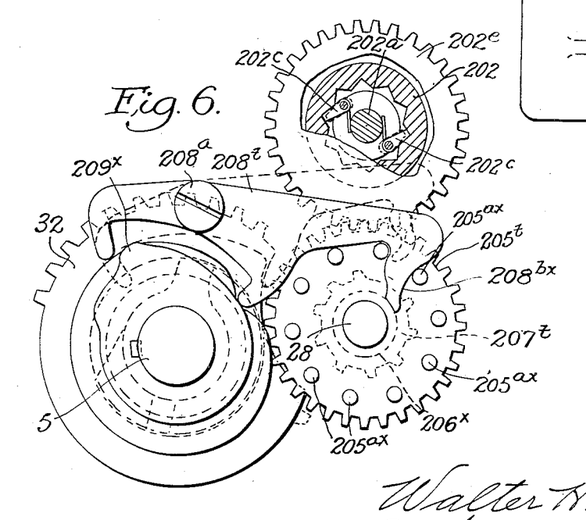
Fig. 6 is a detail view of the means for advancing and retarding the tens wheel operating mechanisms with part broken away to show the driving pawls in advanced and retarded position.
Figures 15, 19:
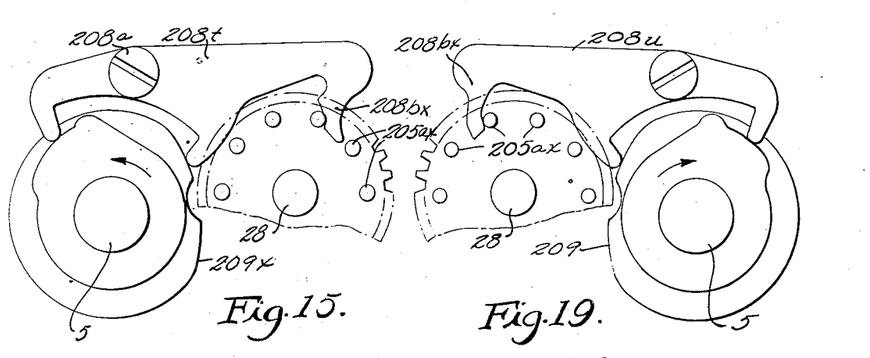
Fig. 15 is a diagrammatic side elevational view looking in the direction of the arrow 15 of Fig. 5 showing the arm 208t in stop position.
Fig. 19 is a side elevational view looking in the direction of the arrow 19, Fig. 5, showing the arm 208u in stop position.

Upon one side face of the spur gear 205t are ten projecting pins 205ax equally spaced in a circle (Figs. 5, 6 and 10). An arm 208t (Fig. 5) is pivoted at 208a and has a cam shaped end 208bx (Fig. 6) which is caused to enter between two of the pins 205ax by the action of a cam 209x, as shown in Fig. 15 at the time when the last tooth of a gear segment 32 is leaving engagement with the pinion 207t. The gear 205u actuating the units wheel is also similarly provided with ten pins 205a and an arm 208u is pivoted at 208a and has a similar cam shaped end which is caused to enter between two of the pins 205a as shown in Fig. 19, by the action of a cam 209, at the time when the last tooth of a gear segment 32 is leaving engagement with the pinion 207u.

When the machine is at rest none of the gear segments 32 are in engagement with either of the gears 207t, 207u. The tens drive shaft 206t with its attached gear 205t cannot revolve because 208bx of arm 208t is between pins 205ax, having entered between them on the previous operation just as the last tooth of gear segment 32 was leaving gear 207t, or 207u, if the units side is being driven. Likewise the unit drive shaft 206u and its attached gear 205u cannot revolve, because 208bx of arm 208u is between similar pins on gear 205u. The entering of the ends of these arms between these pins also prevents the register from overthrowing an extra number.

Facing the tens side of the machine; the gear 205t moves clockwise when driving the register wheels for counting, therefor advance and retract refer to clockwise and anticlockwise motion respectively.

When the machine is at rest the flat ends of pawls 202c (Figs. 12, 13) are not seated against the side of the ratchet teeth or notches 202t, but are withdrawn a slight angular distance up the sides of 202t. This is to ensure that the ends of pawls will not be resting on the high points of 202t. As these pawls are shown in the present Figs. 12, 13, their flat ends are resting against 202t. This has been termed "neutral" position, but the pawls do not stop there.

The cams 209 and 209x are fastened to the main shaft 5, and are substantially identical as are the arms 208u and 208t the only difference being in the shape of the cam faces 208bx (Fig. 6) on their ends. Both arms descend at the same time and engage the pins 205a and 205ax on their respective gears 205u and 205t whether it has been driving its side of the counter or not.

These arms 208t and 208u are designed to (1) stop any tendency the gear wheels 205t and 205u may have to move beyond the point to which they are positively driven, (2) to alternately slightly advance and retract said gears, the advancement of the gears 205u being effected to advance and retract the pawl 203c only when a transfer is effected by the Geneva gear wheel 204a however, and (3) when withdrawing from the pins to leave the gears in a slightly retracted position in order to insure an open path for the first tooth of the gear segments 32 coming into mesh with the pinion 207u or 207t at the next operation of the machine.

Figure 16:
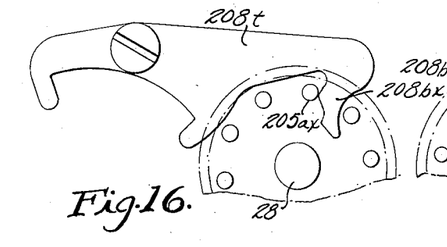
Fig. 16 is a view similar to Fig. 15 showing the arm in a retard or home position.
Figure 17:
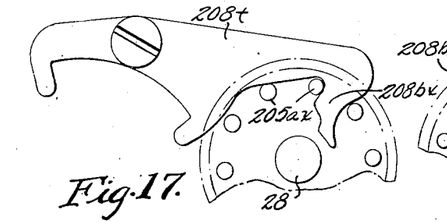
Fig. 17 is a view similar to Fig. 15 showing the arm in advanced position.

In the case of the arm 208t operating on the tens side of the counter, as shown in Figs. 15-18, the cam end 208bx is arranged to stop the gear 205t as in Fig. 15, then retract said gear as in Fig. 16, and here the mechanism is stopped, it being the end of an operation or the home position. This retracting movement of the gear 205t will cause the pawls 202c to be withdrawn from the full line position of Fig. 12 to the dot and dash line position and will occur on each machine cycle of operation. Thus, when the sleeve 202 is rotated by the pawls 203c, which are associated with the units Geneva transfer, in a manner which will be later more fully described, the retracting movement of the pawls 202c will prevent their resting on the top of any of the ratchet teeth 202t, over which pawls the teeth had previously been freely moving. At the beginning of the next operation the arm 208t continues its descent and advances the gear beyond the first stopping position or neutral point as in Fig. 17, which will advance the ratchet teeth 202t beyond the pawls 203c as indicated by the dot and dash line position Fig..13. It then ascends as in Fig. 18, and finally leaves the gear, as stated above, in a slightly retracted position ready for the next engagement of the segmental gear with the pinion.

The action of the arm 208u operating the units side differs from the above only in the sequence of the impulses given to the gear 205u. These are given in reverse order, i. e., advance, as in Fig. 20 and retract, as in Fig. 21, instead of retract and advance, as the gears 205t and 205u are moved in opposite directions simultaneously during these impulses. Both gears however are finally left in the same relative position when the arms are withdrawn.

The movement of the arms 208u and 208t in approaching the home position during their descent is retarded by means of the cams 209 and 209x to avoid the building up of dangerous momentum in the tens wheel 202; and they are also retarded on leaving engagement on the upward move to prevent gear 205u or 205t from racing. As a further preventive brakes 210 may also be applied to the shafts 201a and 202a of both counters, as shown in Figs. 9 and 10.

As previously stated the tens wheel is intermittently driven from the units wheel by means of the Geneva gear 204a one step for each revolution of the units wheel to thereby effect a tens transfer. Therefore it will be obvious that this is the only time that the pawls 203c become effective in rotating the tens wheel or shell 202 and that only at this time will the action of the arm 208u have any effect with regard to the control of position or rectification of the pawls 202c. The rectifying movement as caused by the operation of the arm 208t however, is effective on each cycle of operation.

To understand more clearly why there is a reversal of movement of the pawls 202c and 203c as effected by the cam portions of the arms 208t and 208u, the combined action of the two arms will be described.

Assuming that the units wheel has just completed its movement through the ten position and that the transfer was made through the Geneva drive gear 204a, both arms 208t and 208u will have moved simultaneously to the initial stopping positions shown in Figs. 15 and 19. From these positions the arm 208t will move downward to a position which will cause the pawls 202c to be retracted to their dot and dash line position, Fig. 12, while the arm 208u will move downward to a position which will cause the pawls 203c to advance and thereby advance the tens wheel 202 slightly. The pawls 202c which had been rocking freely about fixed axes while the ratchet teeth moved thereover during the drive of the tens wheel 202 by the pawls 203c, will thus be spaced a sufficient distance away from the ratchet teeth, with which they should next engage, to thereby prevent the said pawls 202c from resting upon the top of said ratchet teeth or being in a position to engage the wrong ratchet teeth on the next operation if the drive is next taken through the pawls 202c. In other words the possibility of this error is rectified.

The opposite or advance movement which is given to the pawls 203c by means of the cam portion of the arm 208u is particularly provided to ensure the completion of rotation of the Geneva gear 204a so that the wide tooth portion on said Geneva gear, Fig. 9, will fully clear the tooth space on the periphery of the unit wheel 201.

In a postage meter machine of this type it is important that this clearance be ensured. The reason being that this Geneva gear 204a is mounted (loosely) on the same rod as the other Geneva gears of the register. In order to reset the descending, or substracting, register when the meter locks out, it is necessary to rock all of the Geneva gears clear of the numeral wheels. When the register locks out at the time the units Geneva gear 204a has just completed a transfer to the tens wheel, its wide tooth must be fully clear of the tooth space on the unit wheel, otherwise the Geneva gears cannot be rocked out for resetting.

Figure 20:
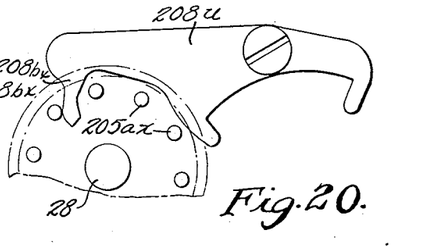
Fig. 20 is a view similar to Fig. 19 showing the arm in advance or home position.
Figure 21:
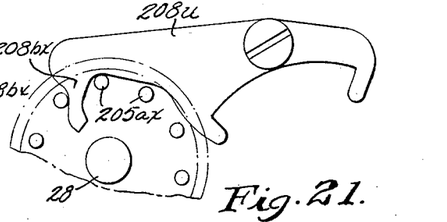
Fig. 21 is a view similar to Fig. 19 showing the arm in retard position.

Upon movement of the arms 208t and 208u from the latter position which is the home position, as in Figs. 16 and 20, the rectifying action is continued still further before the commencement of another registering operation. During this further movement to the positions of Figs. 17 and 21, the pawls 202c and 203c are caused to move in the opposite directions and opposite to the directions just described, that is, the pawls 202c will be advanced to engage with the ratchet teeth 202t, while the pawls 203c will be backed away from the ratchet teeth. This motion would not effect any rectification under the present conditions, but if the operation of the number wheels had been controlled from the tens drive, the advance movement of the pawls 202c would cause the shell 202 to be driven, to advance the ratchet teeth 202t with respect to the pawls 203c and thereby prevent the said pawls from resting upon the top of the ratchet teeth.

Figure 18:
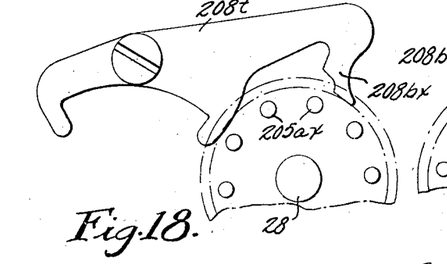
Fig. 18 is a view similar to Fig. 15 showing the arm in raised or running position.
Figure 22:
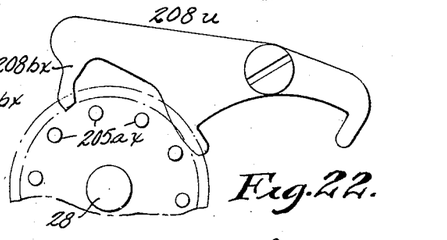
Fig. 22 is a view similar to Fig. 19 showing the arm in its raised or running position.

Upon the reverse or upward movement of the arms 208t and 208u, the gears 205t and 205u will again assume the positions shown in Figs. 18 and 22 respectively.

The above described movements of the arms 208t and 208u not only ensures the meshing of the gear segments and gears, but also brings the register wheels back into necessary alignment to enable the locking devices (when the postage amount is exhausted) to operate, for correct setting up of the wheels in the post office and for correct reading of the figures, and what is also of importance, the retracting, or moving back, of the pawls inside the tens wheel.

In actual use of these machines the operator turns the crank handle quickly and the number wheels and their driving gears whirl very rapidly, necessitating the mechanical safeguards incorporated in the mechanism.

As the units wheels only operates the tens wheel when it is transferring its full count of 10 to said tens wheel, therefore there are only two positions when the supplementary motion from the units wheel cam lever 208u can be transmitted to the gear 203. One is when the units wheel has stopped so that the two half teeth on its rim are just about to engage a tooth of the related Geneva gear, the other is when the units wheel has stopped so that the two half teeth have just left a tooth of said Geneva gear, but are still practically in contact with it. While the transfer is actually being made the cam lever arms 208t and 208u are clear of the pins 205 and 205a. The driven tens wheel must then be advanced far enough to ensure the dropping in of the tens pawl 202c, and this action must be independent of and supplementary to the normal drive. It would suffice if pawl 202c was operated to normally drive the tens wheel beyond the normal stopping point and was then retracted to a position slightly back of such point.

In our mechanism, however, both the pawls are advanced and retracted, one motion being the reverse of the other. The advance and retraction of the units drive naturally affects the relative positions of the ratchet teeth and the actuating pawl 202c at the positions mentioned above. At all other times the effect is interrupted because the related Geneva is at rest on the rim of the units wheel. This double action is desirable in this type of mechanism for the necessary alignment of the number wheels for locking, setting and reading. Although in this instance the supplementary motion is imparted to the pawls themselves, obviously the same effect might be obtained by the advancement of the tens number wheel itself by another entirely separate means. In the present invention the desired effect is more simply obtained by utilizing the normal gear drives (two in this case) for imparting the motion.

It is obvious that the ratchet drive can be applied to other wheels in the register if desired, in case higher values than those registered by operating the tens wheel were to be printed and registered at one operation of the machine. In the foregoing description we have assumed that one unit was the lowest value to be registered. In some cases fractional values (less than one) may be registered. For instance, if the machine is a one cent unit machine, the units wheel will move one space when the selector dial is set at "1"; if it is a half cent unit, the units wheel will be moved two spaces. Assuming that it is a one cent unit; if the selector dial is set at a figure below 10 only the units wheel will register. If the dial is set at 10 or a multiple thereof the tens wheel registers and transfers to the higher wheels, the units wheel not turning. If the dial is set at a figure higher than ten, but not a multiple thereof, such as 11, 12, 15, 22, the drive is through the units wheel as its pinion 207u is the one driven by one of the segmental gears. We have in the description referred to "units wheel" and "tens wheel". We mean thereby to include any two wheels of different denominations in the register which it may be desired to operate in the manner described.

Operation

The operation of the machine and several parts thereof embodying the present invention is hereinbefore clearly set forth. In brief, when a stamp of less value than ten is to be printed the rod 23 is pushed inward and then turned until the proper printing stamp on wheel 17a is brought to operative position, and this movement of the rod will also, through the mechanism described, shift the gear segment carrier so that the segment corresponding to the stamp desired is brought into position to mesh with the units pinion 207u; then the rod is released and the parts are operated by turning the crank 21 one revolution during which revolution the stamp is printed on the envelope as described, and the units wheel is shifted a number of digits corresponding to the value of stamp. The tens wheel however will not then be driven except in event of a carry over from the units wheel to the tens wheel.

If a stamp of the value of ten or more is to be printed the rod 23 is pushed inward and turned to adjust the wheel 17a to bring the proper denomination printing surface to operative position; and simultaneously carrier 32a is shifted to bring the proper gear segment 32 into position to mesh with the tens pinion 20*7t*; then the rod 23 is released and crank 21 turned one revolution, during which revolution the stamp is printed on the envelope and the tens wheel is actuated the proper extent to register the value of the stamp printed; and during such operation the units wheel remains unaffected.

The construction described enables the machine to be readily set in a very simple manner to print any desired value that may be engraved on the value printing wheel 17a; and said wheel can be adjusted to proper position to print the value desired by simply turning the rod 23 by means of knob 23a and such turning of the rod automatically varies the position of the register operating gear segments so that the register will be actuated either through the units wheel or the tens wheel in accordance with the denomination or value of the stamp printed.

By employing one set of gear segments and means whereby the segments can be caused to operate either the units wheel or the tens wheel of the register, the machine is greatly simplified, the number of operative parts which would be ordinarily required greatly lessened, and excessive wear on the units wheel (which ordinarily would be caused by having to transmit all denominations to be registered through such wheel) is obviated, and the durability and accuracy of the register enhanced.

We claim:—

1. In a device of the character specified including a register wheel of lower order and a register wheel of higher order, alternately operable driving mechanisms for actuating the register wheel of higher order, said driving mechanisms consisting of ratchet pawls, and supplementary driving means functioning once for each cycle of operation to assure the engagement of both drives for the ensuing registration during the next cycle of operation.

2. In combination with a register, a drive for actuating the units wheel thereof, a drive for operating the tens wheel thereof, and means for slightly advancing each drive after its normal operation, to insure effective operation of the other drive.

3. In mechanism as set forth in claim 2, means for slightly retracting each of these drives after its advancement.

4. In a register having numeral wheels and carry over devices; selectively operable drives for independently operating the units wheel or the tens wheel, and means for slightly advancing each drive after its normal operation to insure effective operation of the other drive.

5. A register all the wheel of which are straight Geneva operated except the tens wheel and wherein the Geneva drive is maintained in constant operative relation with the said wheels, two alternately operated ratchet driving mechanisms in operative engagement with the tens wheel, one ratchet drive being Geneva operated from the units wheel, and the other ratchet drive being separately operated by an individual drive, and means for slightly advancing each of these drives after its normal operation to insure effective operation of the other means.

6. A register all the wheels of which are straight Geneva operated except the tens wheel and wherein the Geneva drive is maintained in constant operative relation with the said wheels, two alternately operated ratchet driving mechanisms in operative engagement with the tens wheel, one ratchet drive being Geneva operated from the units wheel, and the other ratchet drive being separately operated by an individual drive, and means for slightly advancing and then retracting each drive after its normal operation to insure effective operation of the other drive.

7. In a register of the character described having a tens wheel and means whereby said tens wheel can be operated by the units wheel or by a separate drive, means operable between each cycle of registration for advancing each of these drives beyond their ordinarily actuated position.

8. In a register of the character described having a tens wheel, and means whereby said tens wheel can be operated by the units wheel or by a separate drive; means operable between each cycle of registration for advancing each of these drives beyond their ordinarily actuated position and a means for retracting them when advanced beyond such position.

9. In combination with a register, a drive for actuating the register, means for slightly advancing and then retracting the drive after its normal operation to insure effective subsequent operation.

10. In combination with a register, a drive for actuating a wheel of lower denomination, a drive for operating a wheel of higher denomination, and means for slightly retarding each drive as it nears the end of its normal operation.

11. In mechanism as set forth in claim 10, means for slightly advancing and then retracting each drive after its normal operation to insure effective operation of the other drive.

WALTER H. WHEELER, Jr.
JACOB W. OGDEN.